(12) United States Patent
Koyano et al.

(10) Patent No.: US 7,058,298 B2
(45) Date of Patent: Jun. 6, 2006

(54) OPTICAL TRANSMISSION DEVICE AND OPTICAL TRANSMISSION SYSTEM

(75) Inventors: Hideaki Koyano, Kanagawa (JP); Masato Kobayashi, Kanagawa (JP); Kazumaro Takaiwa, Kanagawa (JP); Maki Hiraizumi, Kawasaki (JP); Akio Takayasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/094,075

(22) Filed: Mar. 8, 2002

(65) Prior Publication Data

US 2002/0097462 A1 Jul. 25, 2002

Related U.S. Application Data

(63) Continuation of application No. PCT/JP99/06269, filed on Nov. 10, 1999.

(51) Int. Cl.
*H04B 10/08* (2006.01)
(52) U.S. Cl. .............................. 398/17; 398/10; 398/19
(58) Field of Classification Search ................ 359/119, 359/127, 494, 495, 496, 497, 498, 499, 500, 359/337.1; 398/1–214
See application file for complete search history.

(56) References Cited

U.S. PATENT DOCUMENTS

| 4,887,309 | A | | 12/1989 | Andersson et al. |
| 5,442,623 | A | * | 8/1995 | Wu .............................. 370/224 |
| 5,500,756 | A | * | 3/1996 | Tsushima et al. ........... 359/174 |
| 5,721,727 | A | | 2/1998 | Ashi et al. |
| 5,903,370 | A | * | 5/1999 | Johnson ....................... 359/119 |
| 5,982,517 | A | * | 11/1999 | Fishman ..................... 359/119 |
| 6,130,764 | A | * | 10/2000 | Taniguchi ................... 359/110 |
| 6,201,788 | B1 | * | 3/2001 | Ishiwatari ................... 359/119 |
| 6,404,525 | B1 | * | 6/2002 | Shimomura et al. ........ 359/110 |
| 6,496,300 | B1 | * | 12/2002 | Kinoshita et al. ......... 359/337.1 |
| 6,532,089 | B1 | * | 3/2003 | Asahi .......................... 398/82 |

FOREIGN PATENT DOCUMENTS

| JP | 64-037134 | 2/1989 |
| JP | 2-146646 | 6/1990 |
| JP | 06-209284 | 7/1994 |
| JP | 8-097841 | 4/1996 |
| JP | 11-112422 | 4/1999 |
| JP | 11-289295 | 10/1999 |

\* cited by examiner

*Primary Examiner*—David C. Payne
(74) *Attorney, Agent, or Firm*—Katten Muchin Rosenman LLP

(57) ABSTRACT

An optical transmission device in which optical signal switching is performed to allow the device to be reduced in size and also which is capable of efficient recovery from fault, thereby improving system expansibility and communication quality. Overhead terminating section converts an optical signal to an electric signal and performs an overhead process including extraction of fault information and setting of status information. Optical switch section performs a process of switching the optical signal between active and standby lines, and switching control section provides a switching command to the optical switch section in accordance with the fault information.

5 Claims, 15 Drawing Sheets

OPTICAL TRANSMISSION DEVICE AND OPTICAL TRANSMISSION SYSTEM

This application is a continuation of international application number PCTJP 99/06269, filed Nov. 10, 1999.

BACKGROUND OF THE INVENTION (1) Field of the Invention

The present invention relates to an optical transmission device and an optical transmission system, and more particularly, to an optical transmission device for controlling the transmission of optical signals and to an optical transmission system for controlling the transmission of optical signals over a ring network.

(2) Description of the Related Art

Optical communication network technology is a core technology for constructing the infrastructure of information communication networks and is undergoing rapid development for the present-day information-oriented society in which highly advanced, wider-coverage services are demanded. Also, investigation is being made into network topologies that suit various fields of applications of optical communications.

FIG. 14 illustrates an optical communication ring system. Nodes 101 to 104 are connected in ring form by an optical fiber cable. To ensure the reliability in case of fault, the inter-node connection is configured as a redundant system including Work (active) lines and Protection (standby) lines.

In the case of ring topology like the illustrated one, basically there is no limit on the number of nodes that can be connected to the system. Ring topology is therefore suited for relatively large-scale networks and is often applied to optical LANs etc. for the trunks of local networks.

FIG. 15 schematically illustrates the internal configuration of a conventional node. The node 101 is connected to other nodes via the Work and Protection lines.

The node 101 comprises a signal processing section 101-1 and an electric switch section 101-2. The signal processing section 101-1 converts an electric signal supplied from the electric switch section 101-2 to an optical signal and transmits the resulting signal to other nodes. Also, the signal processing section converts an optical signal received from other nodes to an electric signal and supplies the resulting signal to the electric switch section 101-2.

The electric switch section 101-2 electrically switches signals to be supplied to and received from the signal processing section 101-1 and, in case of fault, carries out a switchover between the Work and Protection transmission lines.

While the above node uses an electric switch in its switch section, there has also been proposed a technique of using an optical switch in place of an electric switch. For example, Unexamined Japanese Patent Publication (KOKAI) No. 6-209284 discloses using a plurality of 2×2 (2-input, 2-output) optical switches to perform switchover between transmission lines.

In the aforementioned conventional node provided with an electric switch section, however, in order for the electric switch section to process high-speed data, it is necessary that the node be provided with a DMUX section for converting high-speed data to low-speed data so that the electric switch section can process the data, as well as an MUX section for converting low-speed data output from the electric switch section to high-speed data. A problem also arises in that increase in transmission speed entails enlargement of the scale of the circuitry of these converting sections.

Further, when the high-speed data/low-speed data conversion is performed, an increased number of signals are input to and output from the electric switch section. In such cases, interface signals on the backboard or in the unit also increase, giving rise to a problem that the electric characteristics deteriorate due to crosstalk or the like.

On the other hand, the aforementioned conventional technique using 2×2 optical switches provides only the function of performing switchover between the active and standby lines that carry the ring-side high-speed data. Thus, where a terminal office is connected to the node, no line switching is performed with respect to the terminal office, so that the system lacks expansibility.

Also, since neither fault information extraction process nor device status information setting function is available, a problem arises in that a faulty spot cannot be located.

SUMMARY OF THE INVENTION

The present invention was created in view of the above circumstances, and an object thereof is to provide an optical transmission device in which optical signal switching is performed to allow the device to be reduced in size and also which is capable of efficient recovery from fault, thereby improving the system expansibility and the communication quality.

Another object of the present invention is to provide an optical transmission system in which optical signal switching is performed to allow each of devices constituting the system to be reduced in size and also which is capable of efficient recovery from fault, thereby improving the system expansibility and the communication quality.

To achieve the first object, there is provided an optical transmission device for controlling transmission of an optical signal. The optical transmission device comprises overhead terminating means for converting the optical signal to an electric signal and performing an overhead process including extraction of fault information and setting of status information, optical switch means for performing a process of switching the optical signal between active and standby lines, and switching control means for providing a switching command to the optical switch means in accordance with the fault information.

Also, to achieve the second object, there is provided an optical transmission system for controlling transmission of an optical signal over a ring network. The optical transmission system comprises a plurality of optical transmission devices each including overhead terminating means for converting the optical signal to an electric signal and performing an overhead process including extraction of fault information and setting of status information, optical switch means for performing a process of switching the optical signal between active and standby lines and switching control means for providing a switching command to the optical switch means in accordance with the fault information, and an optical transmission medium connecting the optical transmission devices in ring form to constitute the ring network.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
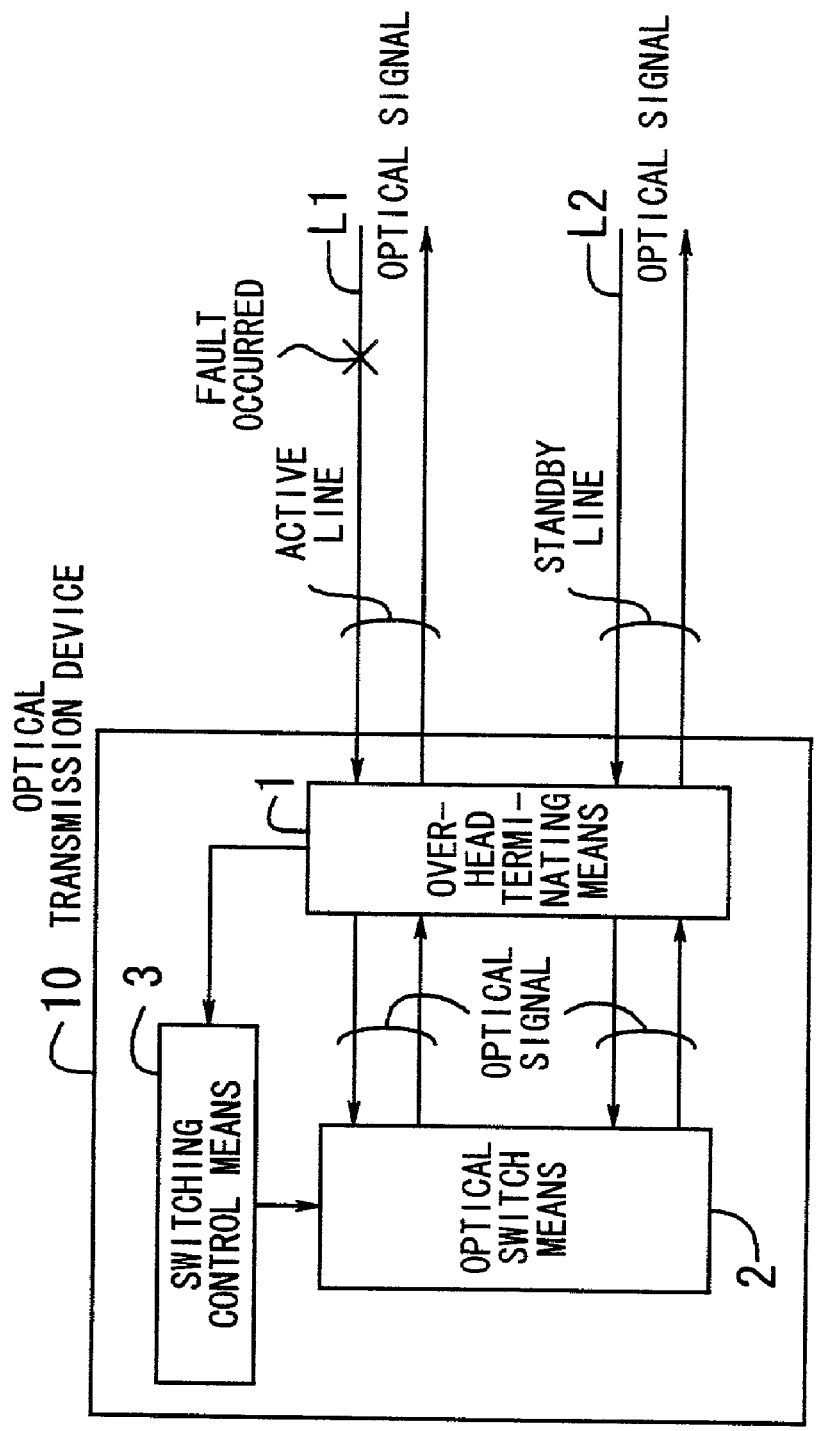
FIG. 1 is a diagram illustrating the principle of an optical transmission device according to the present invention.

Embodiments of the present invention will be hereinafter described with reference to the drawings. FIG. 1 illustrates the principle of an optical transmission device according to the present invention. The optical transmission device 10 controls the transmission of optical signals.

Overhead terminating means 1 converts an optical signal to an electric signal. Also, the overhead terminating means extracts fault information about fault on the transmission line as well as status information of other devices (information about internal fault etc. of the other devices) from the electric signal, and sets status information of its own device. This process carried out by the overhead terminating means is hereinafter referred to as overhead process.

The overhead terminating means 1 outputs the optical signal received from outside to optical switch means 2, and also outputs the optical signal received from the optical switch means 2 to outside.

The optical switch means 2 has an M×N matrix arrangement including M (desired number) input lines and N (desired number) output lines, and switches the optical signal between active and standby lines.

Switching control means 3 provides a switching command to the optical switch means 2 in accordance with the fault information extracted in the overhead process.

In practice, by using APS (Automatic Protection Switch) byte (usually, K byte) as defined in SONET/SDH, the overhead terminating means 1 detects SF (Signal Fail)/SD (Signal Degrade) on the transmission line, and exchanges the fault information with the other devices. In accordance with the level of a fault that has occurred, the switching control means 3 determines whether to carry out a switchover.

For example, in the case where a fault has occurred in an active line L1, as shown in the figure, a switchover to a standby line L2 is carried out. Alternatively, in this case, both the transmit and receive lines may be switched to the respective standby lines. In the following, the active and standby lines are referred to respectively as Work and Protection lines.

Figure 2:
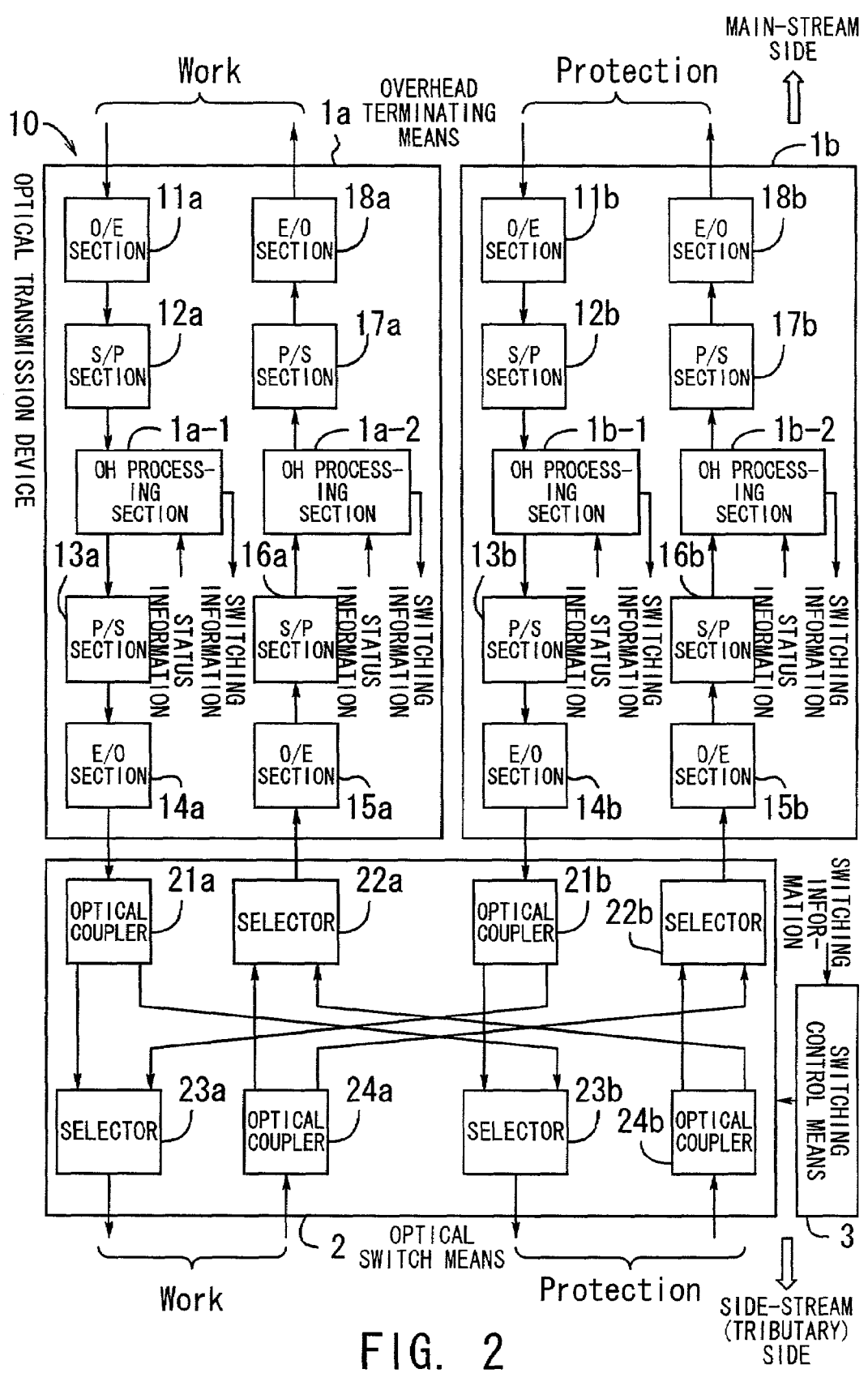
FIG. 2 is a diagram showing the configuration of the optical transmission device.

The configuration of the optical transmission device 10 of the present invention will be now described in more detail. FIG. 2 illustrates the configuration of the optical transmission device 10. The optical transmission device 10 comprises overhead terminating means 1a and 1b associated respectively with the Work and Protection lines of a mainstream side, the optical switch means 2, and the switching control means 3 for providing a switching command for the switching process to the optical switch means 2.

The optical switch means 2 performs a process of switching optical signals from the main-stream lines and sidestream lines (hereinafter referred to as Tributary lines), to carry out a switchover between the Work and Protection lines of at least one of the main-stream and Tributary sides.

An O/E section 11a of the overhead terminating means 1a, which receives an optical signal on the Work line of the main-stream side, converts the optical signal received from the main-stream line to an electric signal. An S/P section 12a converts the resulting serial electric signal to a parallel electric signal.

An OH (overhead) processing section 1a-1 extracts switching information (including fault information about fault on the main-stream line and status information about the status of other devices on the main-stream line) from the parallel electric signal, and supplies the extracted information to the switching control means 3. Also, the OH processing section sets status information which is sent to a terminal office of the Tributary side to notify the same of the status of the optical transmission device 10.

A P/S section 13a converts the parallel electric signal output from the OH processing section 1a-1 to a serial electric signal. An E/O section 14a converts the serial electric signal to an optical signal, which is then output to the optical switch means 2.

An O/E section 15a of the overhead terminating means 1a, which is associated with the transmission of signal to the Work line of the main-stream side, converts an optical signal supplied from the optical switch means 2 to an electric signal. An S/P section 16a converts the resulting serial electric signal to a parallel electric signal.

An OH processing section 1a-2 extracts switching information (including fault information about fault on the Tributary line and status information about the status of the terminal office on the Tributary line) from the parallel electric signal, and supplies the extracted information to the switching control means 3. Also, the OH processing section sets status information which is sent to the other devices on the main-stream line to notify the same of the status of the optical transmission device 10.

A P/S section 17a converts the parallel electric signal output from the OH processing section 1a-2 to a serial electric signal. An E/O section 18a converts the serial electric signal to an optical signal, which is output to the other devices of the main-stream side. The overhead terminating means 1b is configured in the same manner, and therefore, description thereof is omitted.

In accordance with the switching information extracted by the OH processing sections 1a-1, 1a-2, 1b-1 and 1b-2, the switching control means 3 provides a switching command to the optical switch means 2.

The optical switch means 2 has optical couplers 21a and 24a and selectors 22a and 23a associated with the Work lines of the Tributary side, and also has optical couplers 21b and 24b and selectors 22b and 23b associated with the Protection lines of the Tributary side.

The optical coupler 21a splits the optical signal output from the overhead terminating means 1a into two to be supplied to the selectors 23a and 23b. The optical coupler 21b splits the optical signal output from the overhead terminating means 1b into two to be supplied to the selectors 23a and 23b.

The optical coupler 24a splits the optical signal output from the terminal office of the Tributary side into two to be supplied to the selectors 22a and 22b. The optical coupler 24b splits the optical signal output from the terminal office of the Tributary side into two to be supplied to the selectors 22a and 22b.

The selector 23a receives the Work-side optical signal output from the optical coupler 21a and the Protection-side optical signal output from the optical coupler 21b, and selects and outputs one of the optical signals in accordance with the switching command from the switching control means 3.

The selector 23b receives the Protection-side optical signal output from the optical coupler 21b and the Work-side optical signal output from the optical coupler 21a, and selects and outputs one of the optical signals in accordance with the switching command from the switching control means 3.

The selector 22a receives the Work-side optical signal output from the optical coupler 24a and the Protection-side optical signal output from the optical coupler 24b, and selects and outputs one of the optical signals in accordance with the switching command from the switching control means 3.

The selector 22b receives the Protection-side optical signal output from the optical coupler 24b and the Work-side optical signal output from the optical coupler 24a, and selects and outputs one of the optical signals in accordance with the switching command from the switching control means 3.

Let us consider a case where, while the Work lines of the main-stream and Tributary sides are in use, a fault has occurred in the Work receive line of the main-stream side, for example. In this case, the OH processing section 1a-1 notifies the switching control means 3 of the occurrence of the fault by means of the switching information.

The switching control means 3 instructs the selector 23a to select the optical signal output from the optical coupler 21b. Accordingly, the selector 23a performs a switchover of signal from the optical coupler 21a to the optical coupler 21b, and outputs the optical signal supplied from the optical coupler 21b.

Let it be assumed now that, while the Work lines of the main-stream and Tributary sides are in use, a fault has occurred in the Work receive line of the Tributary side. In this case, the OH processing section 1a-2 notifies the switching control means 3 of the occurrence of the fault by means of the switching information.

The switching control means 3 instructs the selector 22a to select the optical signal output from the optical coupler 24b. Consequently, the selector 22a performs a switchover of signal from the optical coupler 24a to the optical coupler 24b, and outputs the optical signal supplied from the optical coupler 24b.

As described above, in the optical transmission device 10 of the present invention, an optical signal is converted to an electric signal to extract the fault information and to set the status information, and optical signal switching is performed in accordance with the fault information, to carry out a switchover between the Work and Protection lines.

Thus, the optical signal per se is subjected to switching, and it is therefore unnecessary to additionally provide circuits such as MUX and DMUX sections, etc., making it possible to reduce the scale of circuitry and to minimize deterioration in the electric characteristics due to crosstalk etc.

Also, where a terminal office is connected to the Tributary side of the optical transmission device 10, the line switching of the terminal office side can also be controlled, whereby expansibility of the system as well as reliability of the overall system can be improved. Further, the OH processing section extracts the switching information and sets the status information of its own device, and this permits a faulty spot to be located with ease.

Figure 3:
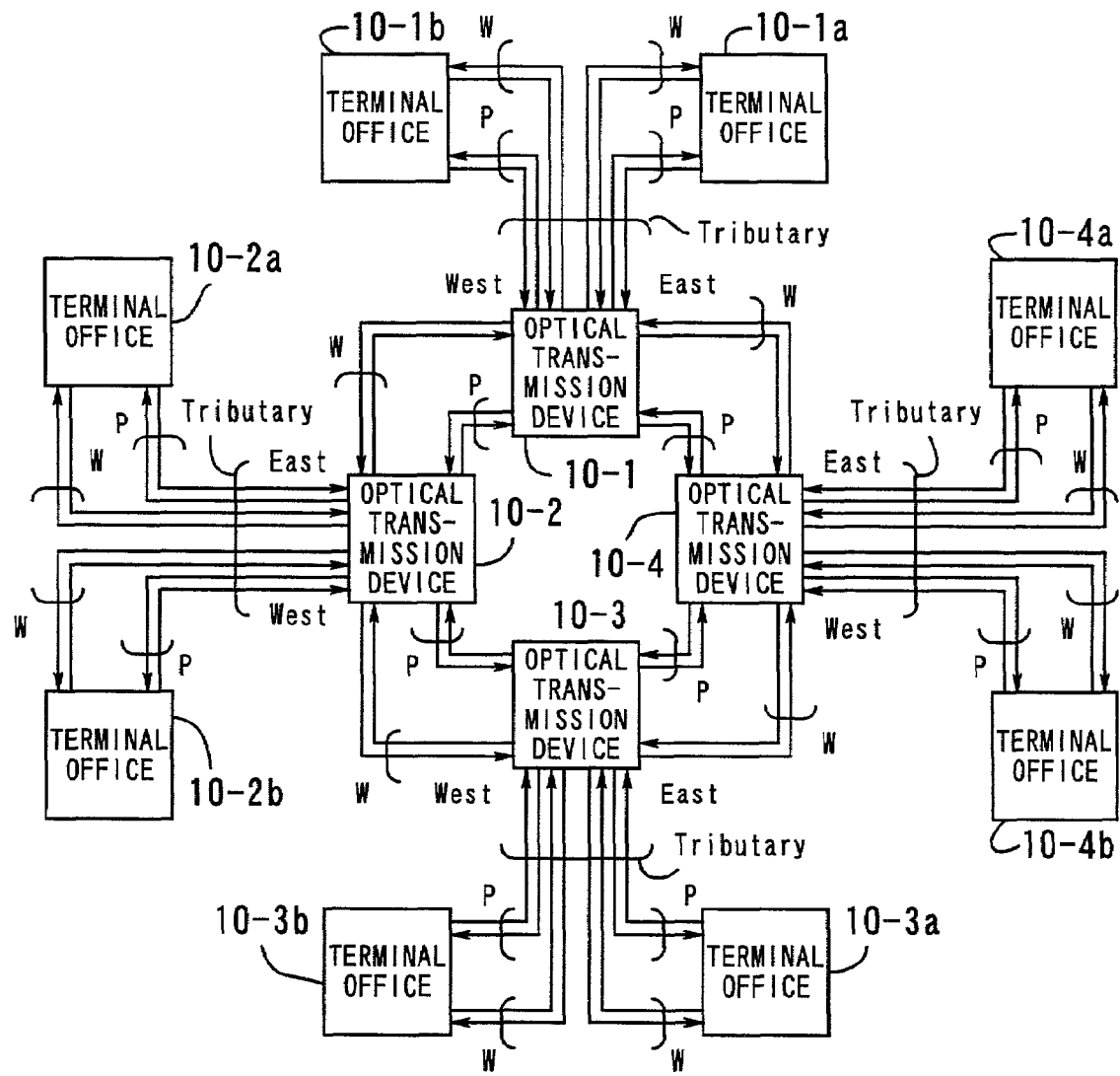
FIG. 3 is a diagram showing an example of a ring system.

A ring system to which the optical transmission device 10 of the present invention is applied will be now described. FIG. 3 shows an example of such a ring system.

Optical transmission devices 10-1 to 10-4 are connected in ring form by an optical fiber cable. The interconnection between the optical transmission devices 10-1 to 10-4 is configured as a redundant system including Work and Protection lines. Also, terminal offices 10-1a and 10-1b are connected to the Tributary side of the optical transmission device 10-1 each by means of a redundant system including Work and Protection lines.

Similarly, terminal offices 10-2a and 10-2b are connected to the Tributary side of the optical transmission device 10-2 each by means of a redundant system, and terminal offices 10-3a and 10-3b are connected to the Tributary side of the optical transmission device 10-3 each by means of a redundant system. Terminal offices 10-4a and 10-4b are connected to the Tributary side of the optical transmission device 10-4 each by means of a redundant system.

Figure 4:
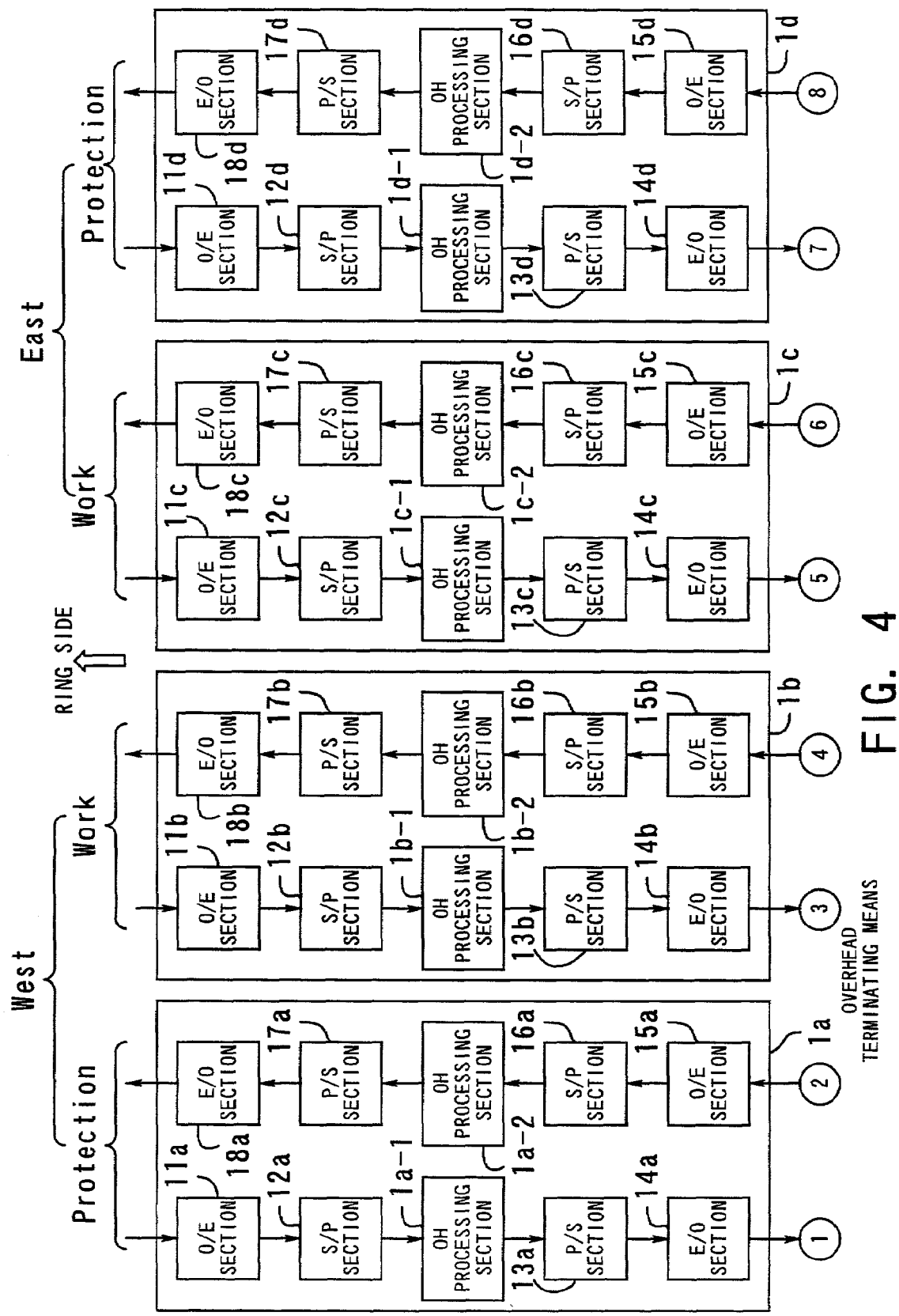
FIG. 4 is a diagram showing the configuration of an optical transmission device in the ring system.
Figure 5:
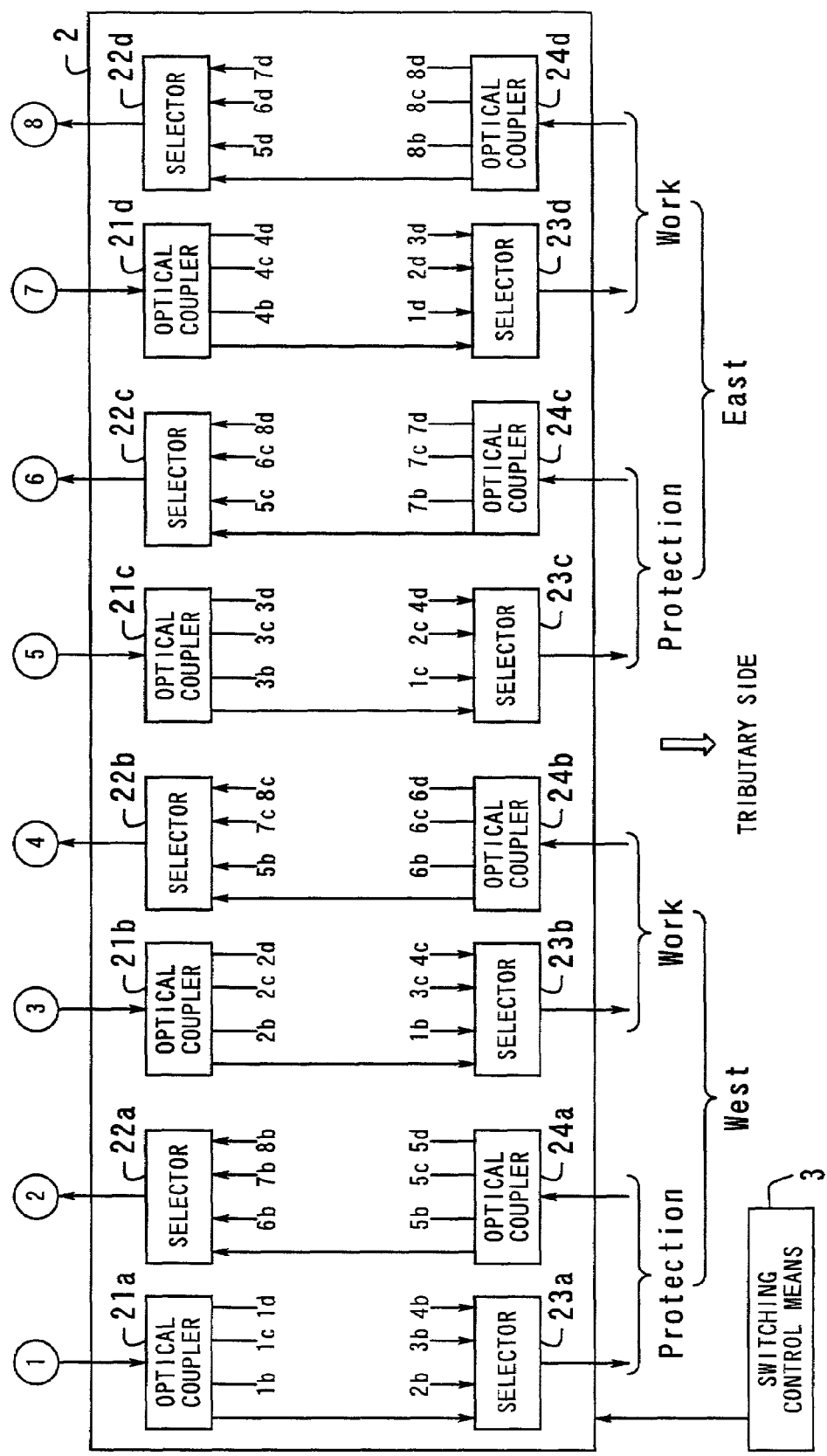
FIG. 5 is a diagram also showing the configuration of the optical transmission device in the ring system.

FIGS. 4 and 5 illustrate the configuration of the optical transmission device 10-1 in the ring system. The optical transmission device 10-1 has overhead terminating means 1a to 1d. The West-side overhead terminating means 1a and 1b have their respective ring-side Protection and Work lines connected to the optical transmission device 10-2, and the East-side overhead terminating means 1c and 1d have their respective ring-side Work and Protection lines connected to the optical transmission device 10-4.

The Tributary-side Protection and Work lines on the West side of the optical switch means 2 are connected to the terminal office 10-1b, and the Tributary-side Protection and Work lines on the East side of the optical switch means 2 are connected to the terminal office 10-1a.

The internal connections of the optical switch means 2 as illustrated signify that the output 1b of the optical coupler 21a, for example, is connected to the input 1b of the selector 23b. The interconnections of the other elements are also illustrated in like manner, and therefore, description of such connections is omitted.

Also, since the internal configurations of the overhead terminating means 1a to 1d and the optical switch means 2 are already explained above with reference to FIG. 2, description thereof is omitted.

Figure 6:
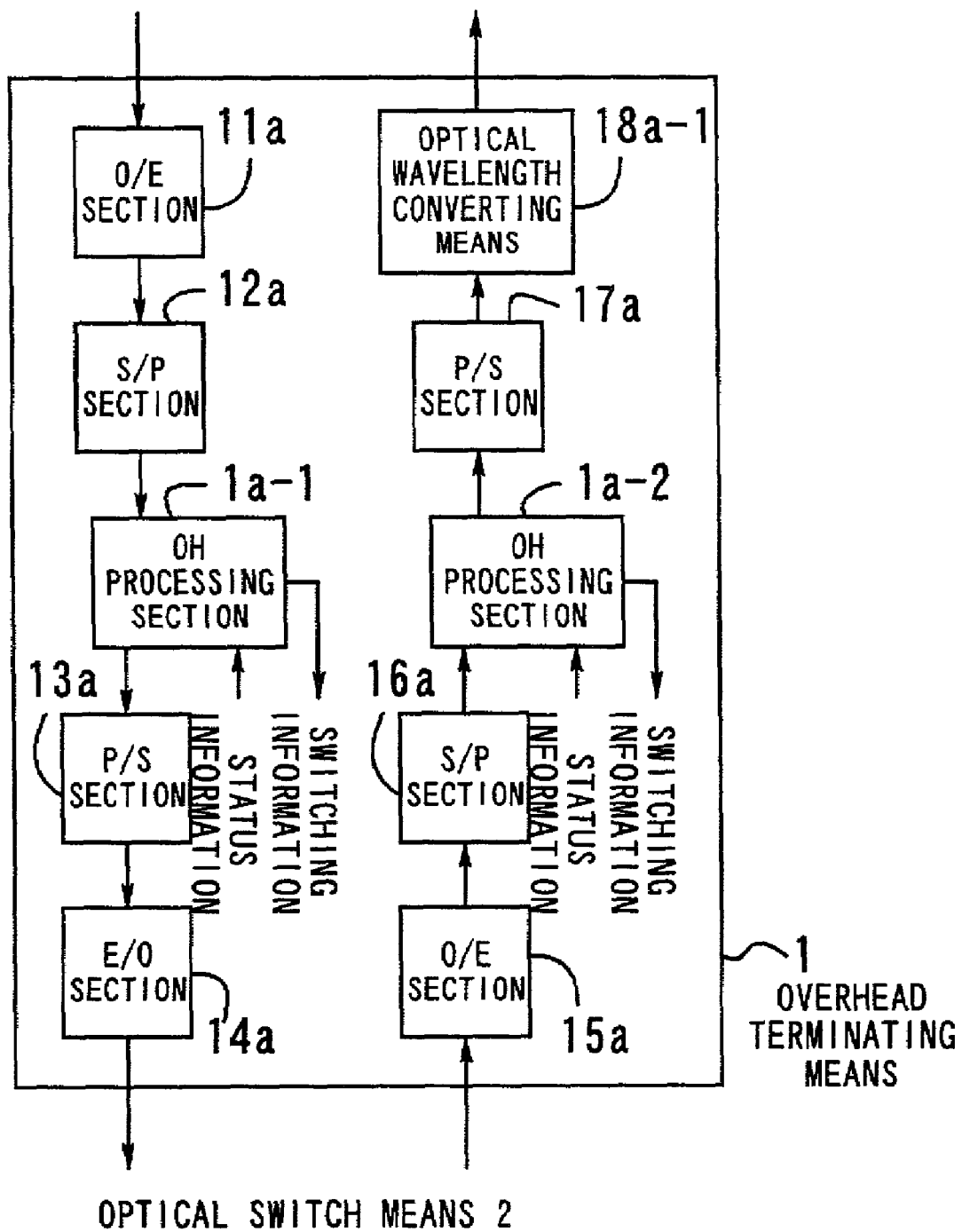
FIG. 6 is a diagram showing the configuration of overhead terminating means which performs optical wavelength conversion.

Overhead terminating means 1 having an optical wavelength converting function will be now described. FIG. 6 illustrates the configuration of the overhead terminating means 1 which performs the optical wavelength conversion. In the figure, identical reference numerals are used to denote components identical with those appearing in FIG. 2, and description of such components is omitted.

Optical wavelength converting means 18a-1 first converts the serial electric signal output from the P/S section 17a to an optical signal, and then converts the wavelength of the optical signal to be output. The optical wavelength converting means 18a-1 can be implemented by a combination of the E/O section 14a and a tunable LD (Laser Diode) having an optical wavelength converting function.

By using the overhead terminating means 1 capable of performing the optical wavelength conversion, it is possible to construct an optical wavelength multiplex system, and the wavelength multiplexing can improve the utility of optical fibers.

Figure 7:
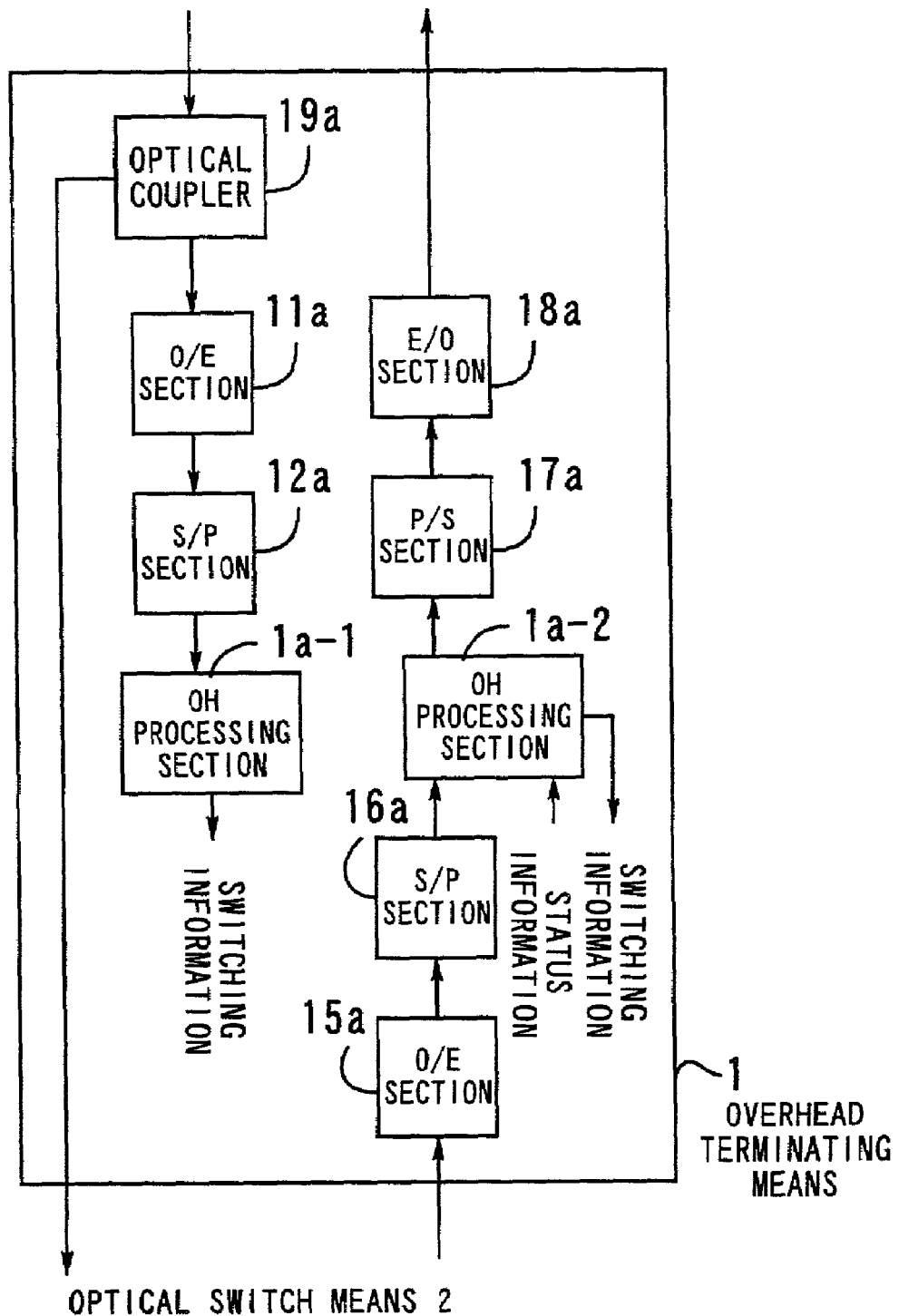
FIG. 7 is a diagram showing the configuration of overhead terminating means having an optical coupler.

Overhead terminating means 1 including an optical coupler will be now described. FIG. 7 illustrates the configuration of the overhead terminating means 1 having an optical coupler. In the figure, identical reference numerals are used to denote components identical with those appearing in FIG. 2, and description of such components is omitted.

An optical coupler 19a splits the optical signal received from outside into two, one being output to the O/E section 11a and the other to the optical switch means 2. The split optical signal output to the O/E section 11a is converted to an electric signal therein, then the resulting serial signal is converted to a parallel signal in the S/P section 12a, and the switching information is extracted in the OH processing section 1a-1. With this configuration, it is possible to reduce the number of circuit elements used in the overhead terminating means 1.

Figure 8:
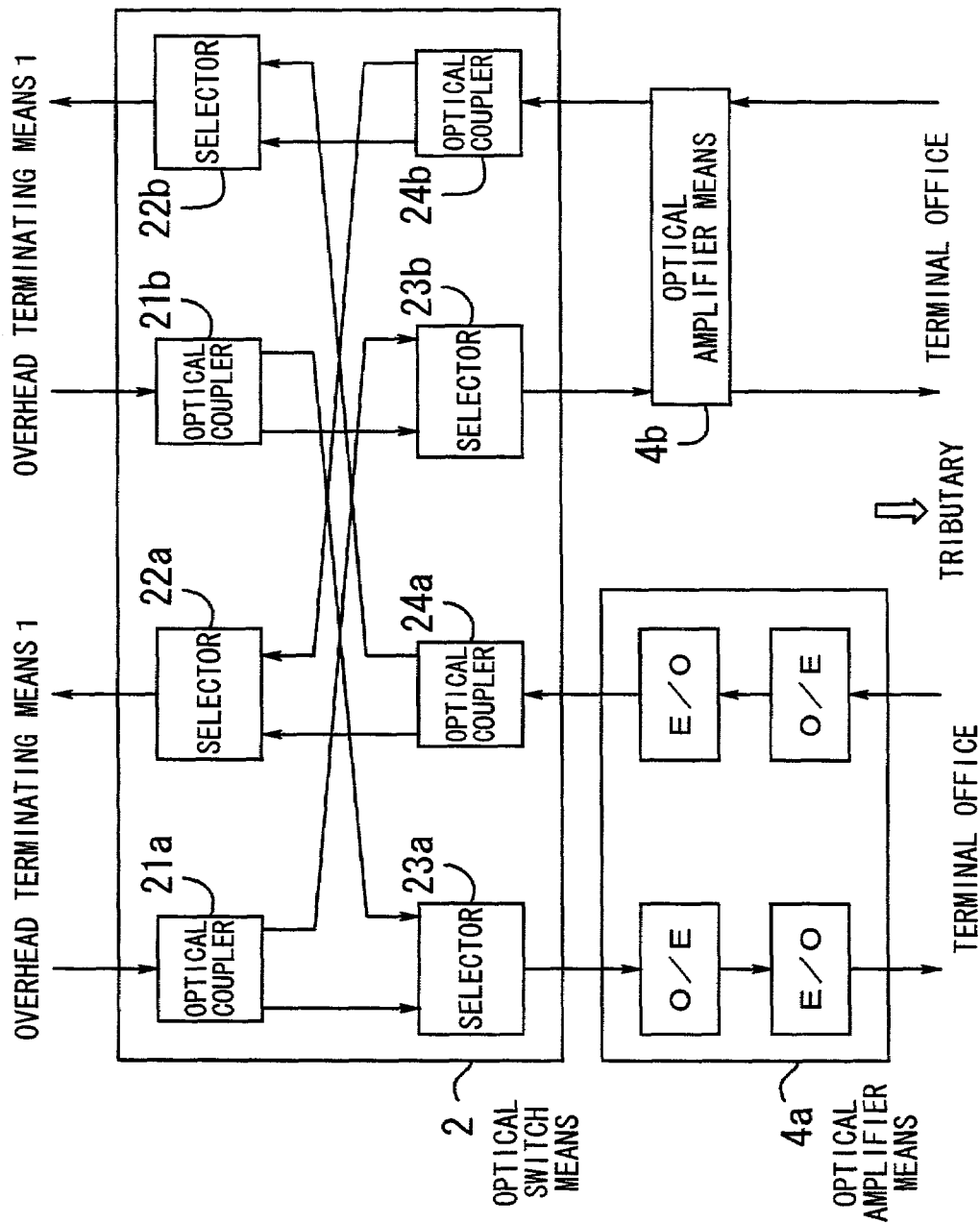
FIG. 8 is a diagram showing optical amplifier means.

Optical amplifier means will be now described. FIG. 8 shows the optical amplifier means. The optical amplifier means 4a and 4b are arranged on the Tributary side of the optical switch means 2 and each comprise E/O's and O/E's.

The optical amplifier means 4a corrects the attenuation in level of the optical signal supplied from the optical switch means 2, and outputs the resulting signal to the Tributary-side terminal office. The optical amplifier means 4b corrects the attenuation in level of the optical signal transmitted from the terminal office and outputs the resulting signal to the optical switch means 2.

Attenuation of optical signal level occurs while the signal passes through the optical switch means 2 or because the terminal office is located at a remote place, but by using the optical amplifier means 4a and 4b, it is possible to correct such attenuation of the optical signal level, thus ensuring high-quality optical communications.

Figure 9:
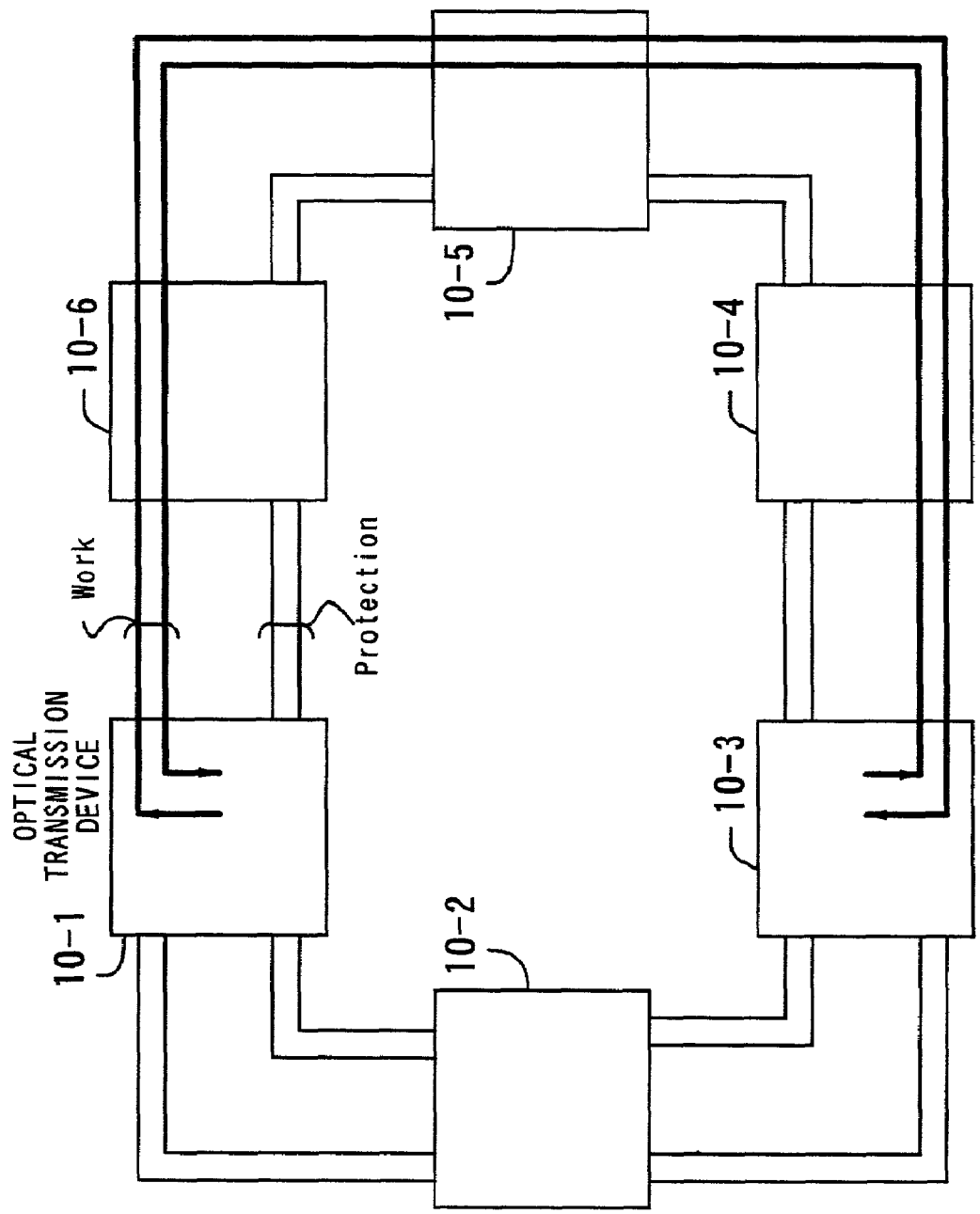
FIG. 9 is a diagram showing a ring system constituted by the optical transmission devices.

The following explains a line switching operation performed in case of fault. FIG. 9 illustrates a ring system constituted by the optical transmission devices 10. The optical transmission devices 10-1 to 10-6 are connected in ring form by an optical fiber cable (4-fiber ring topology). The interconnection between the optical transmission devices 10-1 to 10-6 is configured as a redundant system including Work and Protection lines. It is assumed here that the optical transmission devices 10-1 and 10-3 are communicating with each other via the optical transmission devices 10-4 to 10-6 by using the Work lines.

Figure 10:
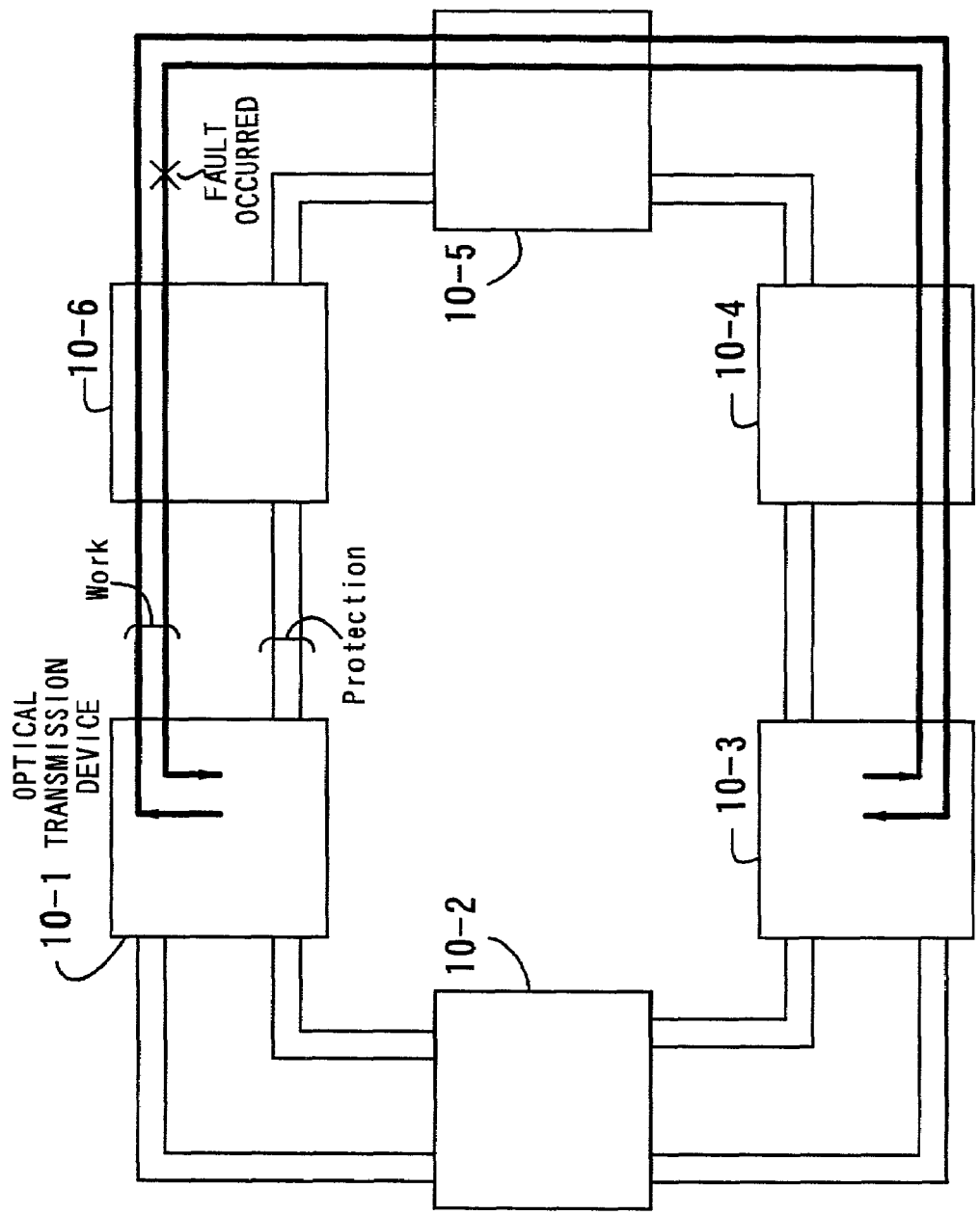
FIG. 10 is a diagram illustrating a case where a fault has occurred in the ring system.

FIG. 10 illustrates a case where a fault has occurred in the ring system. As illustrated, the fault has occurred in a line which, for the optical transmission device 10-1, is the Work receive line.

Figure 11:
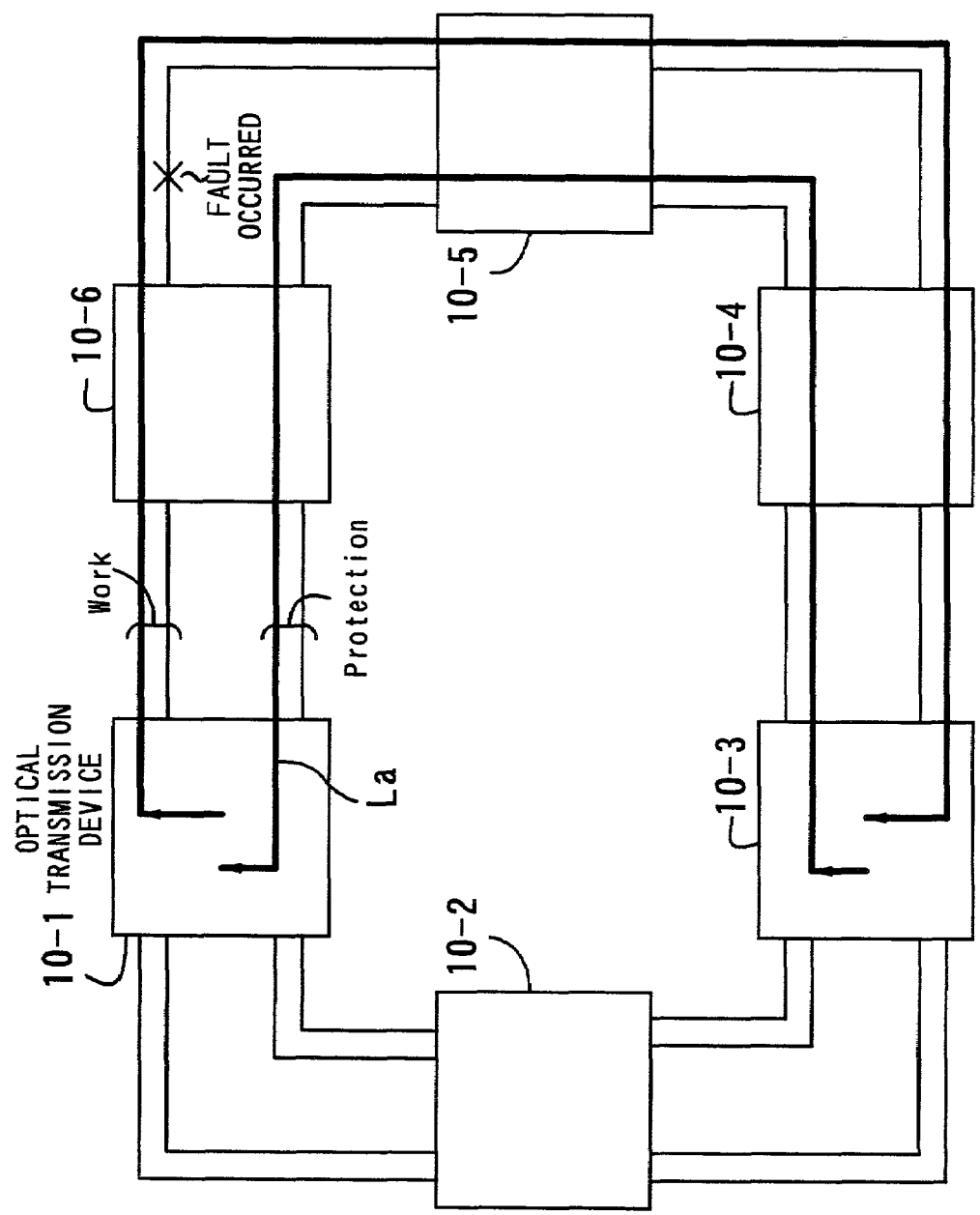
FIG. 11 is a diagram illustrating line switching.

FIG. 11 illustrates line switching. Where the fault has occurred as shown in FIG. 10, the receive line is switched to a line La which, for the optical transmission device 10-1, is the Protection receive line.

First, the overhead terminating means 1 of the optical transmission device 10-1 detects the fault information. The switching control means 3 then determines whether or not the fault occurred is of a level requiring a line switching operation.

If it is judged that the level of the fault occurred requires a line switching operation, the overhead terminating means 1 looks up the status information carried by the overhead on the Protection line La which is identical in data flow direction with the faulty Work line, to determine whether or not a switchover to the line La is possible.

If it is judged that the switchover is possible, the optical transmission device 10-1 transfers a line switching control command to the counter optical transmission device 10-3. The optical transmission devices 10-1 and 10-3 then operate in Protection mode with the line switched by the optical switches in their optical switch means 2, thus recovering from the fault.

Figure 12:
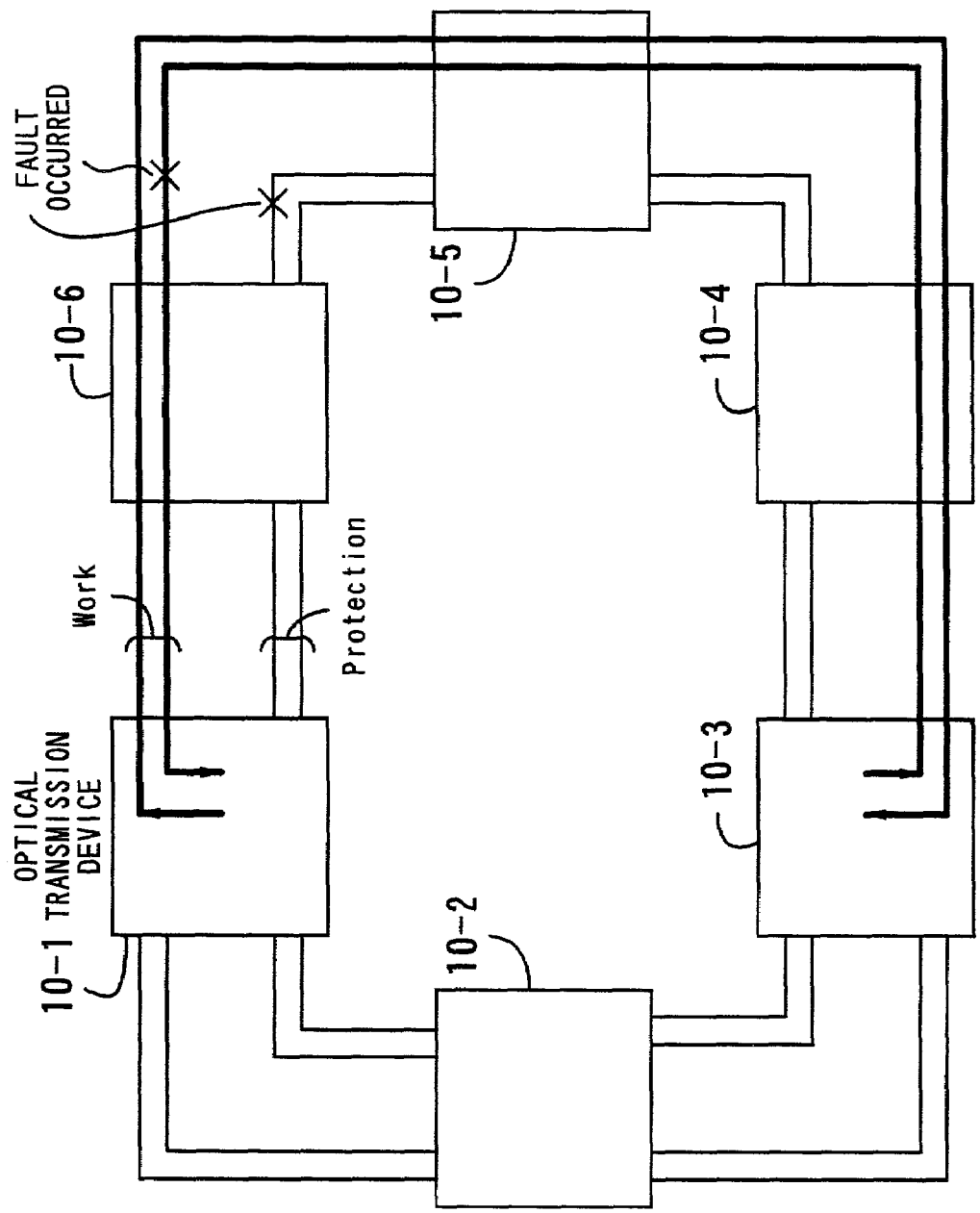
FIG. 12 is a diagram illustrating a case where faults have occurred in the ring system.

FIG. 12 illustrates a case where faults have occurred in the ring system. As illustrated, the faults have occurred in both the Work and Protection lines.

Figure 13:
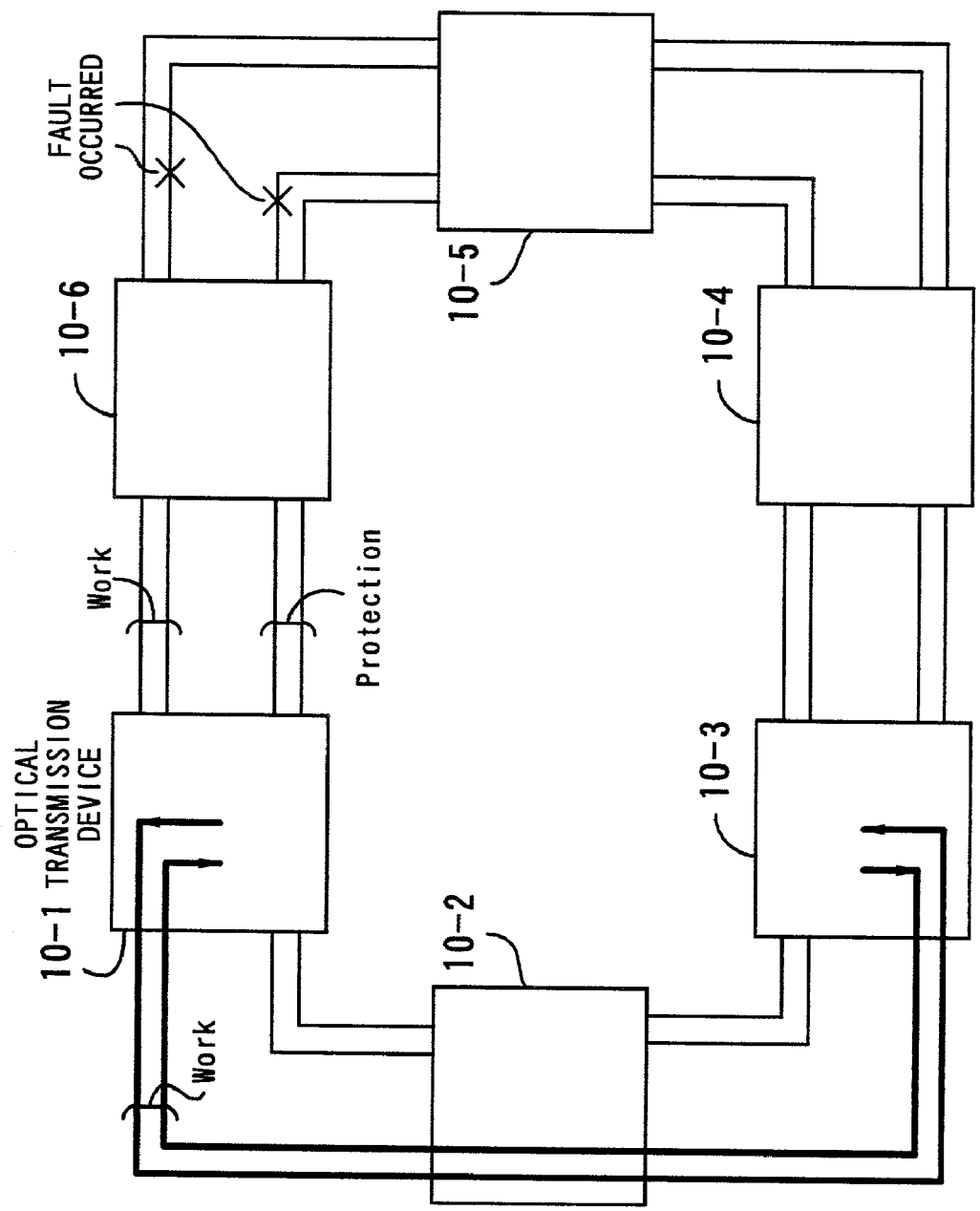
FIG. 13 is a diagram illustrating line switching.
Figure 14:
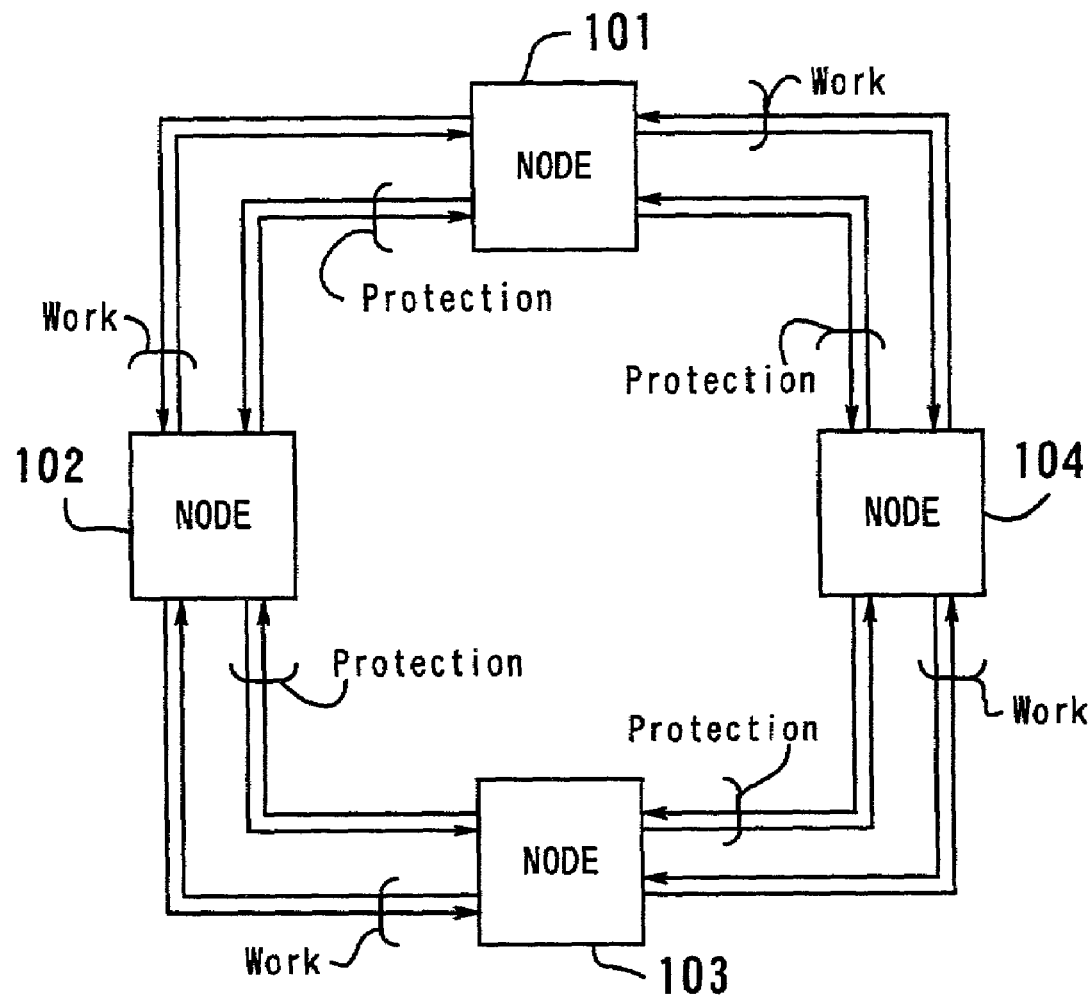
FIG. 14 is a diagram showing an optical communication ring system.
Figure 15:
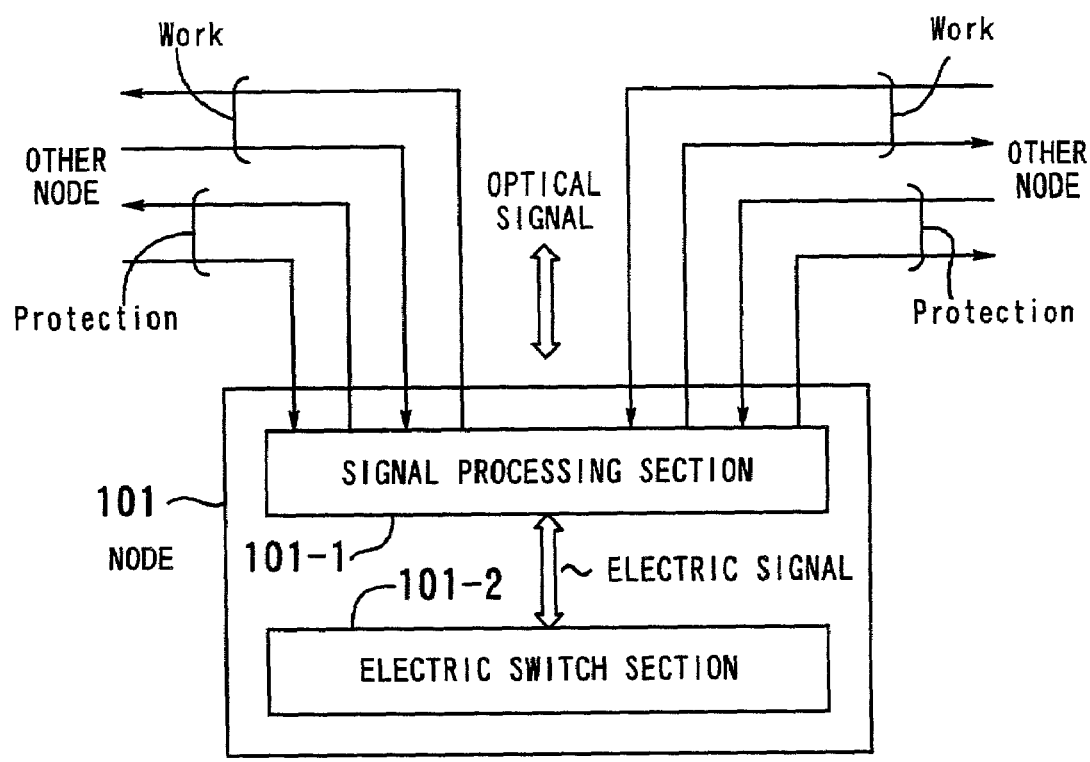
FIG. 15 is a schematic diagram showing the internal configuration of a conventional node.

FIG. 13 illustrates line switching. Where the faults have occurred as shown in FIG. 12, the optical transmission devices 10-1 and 10-3 use the Work lines passing through the optical transmission device 10-2 to recover from the faults.

In the case where faults have occurred in both the Work and Protection lines, the same determinations as explained above with reference to FIG. 11 are made, and if it is judged that the Protection line also is unavailable, switching control is performed to connect the two devices through the reverse course (optical transmission devices 10-1, 10-2, 10-3), thereby recovering from the faults.

While the Protection line is in use, the Work line is monitored, and if the fault is removed, the system resumes a normal operation state and the Protection line is released from service. As described above, the optical transmission device 10 of the present invention has a hybrid configuration such that the extraction of the fault information and the setting of the status information are performed with respect to electric signals while the line switching is performed with respect to optical signals.

Thus, compared with a device using electric switches, the device of the present invention can be reduced in size and also deterioration in the electric characteristics can be lessened.

Also, in the case where an optical wavelength multiplexing device is constructed using electric switches, as many line switching functions as the number of wavelengths to be used need to be provided. With the configuration of the present invention, the overall size of the device can be reduced.

Further, the number of electric processing sections used in the device is small, and accordingly, the device can readily cope with change of transmission method, making it possible to construct a highly flexible system.

As described above, in the optical transmission device of the present invention, the optical signal is converted to an electric signal to extract the fault information and to set the status information, and optical signal switching is performed in accordance with the fault information, to carry out a switchover between the active and standby lines. Accordingly, the device can be reduced in size and also can be efficiently recovered from fault.

In the optical transmission system of the present invention, the optical signal is converted to an electric signal to extract the fault information and to set the status information, and optical signal switching is performed in accordance with the fault information, to carry out a switchover between the active and standby lines. Accordingly, the system can be constructed by small-sized devices and also can be efficiently recovered from fault.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for controlling transmission of an optical signal over a ring network, comprising:
 a plurality of optical transmission devices each including overhead terminating means for converting the optical signal to an electrical signal and performing an overhead process including extraction of fault information and setting of status information, optical switch means for performing a process of switching the optical signal between active and standby lines, and switching control means for providing a switching command to the optical switch means in accordance with the fault information; and
 an optical transmission medium connecting said optical transmission devices in ring form to constitute the ring network;
 wherein said optical switch means performs a process of switching optical signal from a main-stream side and a tributary side, to carry out a switchover between the active and standby lines of at least one of the main-stream and tributary sides,
 wherein said overhead terminating means includes an optical coupler for splitting the optical signal into two signals, such that one of the two optical signals is converted to the electric signal that is subjected to the overhead process and coupled to the switching control means, and the other of the two optical signals is output directly without conversion by said optical switch means, and
 wherein, when a terminal office is connected to the tributary side of said optical switch means,
 said overhead terminating means converts a serial electric signal output from the terminal office into an optical signal, and converts the wavelength of the optical signal,
 said switching control means controls the line switching of the terminal office to transmit optical wavelength multiplex signals for the ring network.

2. An optical transmission device for controlling transmission of an optical signal, comprising:
 overhead terminating means for converting the optical signal to an electric signal and performing an overhead process including extraction of fault information and setting of status information;
 optical switch means for performing a process of switching the optical signal between active and standby lines; and
 switching control means for providing a switching command to said optical switch means in accordance with the fault information;
 wherein said optical switch means performs a process of switching optical signals from a main-stream side and a tributary side, to carry out a switchover between the active and standby lines of at least one of the main-stream and tributary sides,
 wherein said overhead terminating means includes an optical coupler for splitting the optical signal into two signals, such that one of the two optical signals is convened to the electric signal that is subjected to the overhead process and coupled to the switching control means, and the other of the two optical signals is output directly without conversion by said optical switch means, and
 wherein, when a terminal office is connected to the tributary side of said optical switch means,
 said overhead terminating means converts a serial electric signal output from the terminal office into a optical signal, and converts the wavelength of the optical signal,
 said switching control means controls the line switching of the terminal office to transmit optical wavelength multiplex signals for the ring network.

3. The optical transmission device according to claim 2, wherein said optical switch means has an M×N matrix arrangement including M input lines and N output lines.

4. The optical transmission device according to claim 2, wherein, after performing the overhead process, said overhead terminating means converts the electric signal again to an optical signal and outputs the optical signal.

5. The optical transmission device according to claim 2, further comprising optical amplifier means for correcting attenuation in light level of the optical signal.

* * * * *